W. W. Ballard.
Land Roller.
N° 69,611.        Patented Oct. 8, 1867.
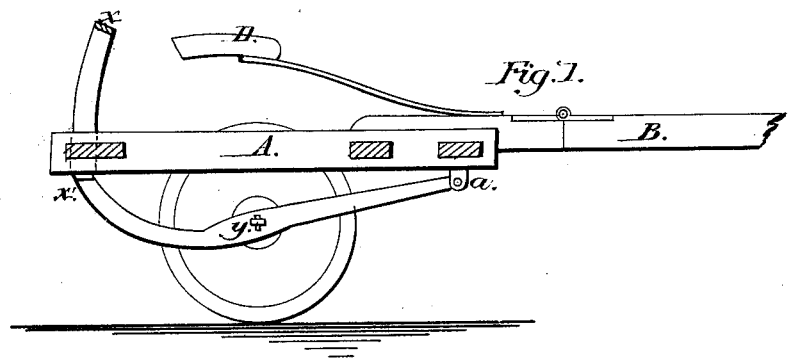
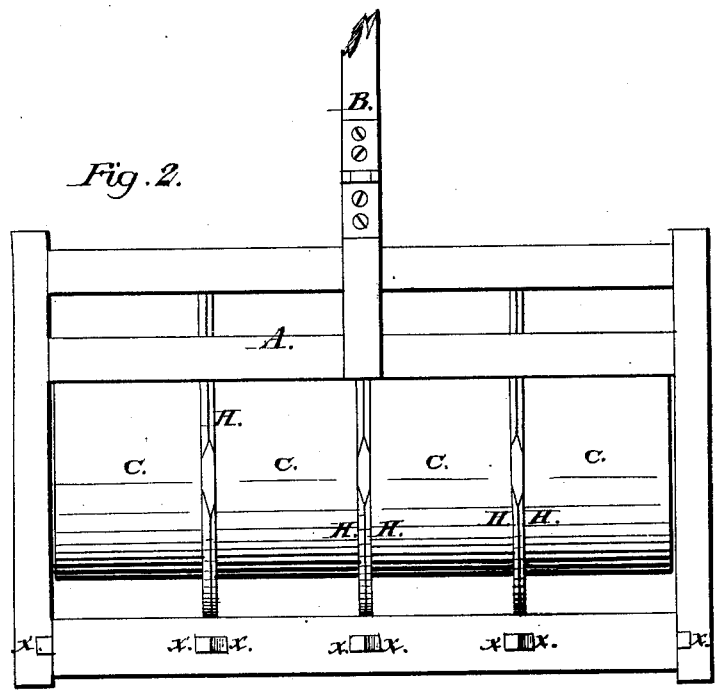
Witnesses:
Inventor:
W. W. Ballard
per
Alexander J. Mason
Attorneys

United States Patent Office.

WILLIAM W. BALLARD, OF DAVISBURG, MICHIGAN.

Letters Patent No. 69,611, dated October 8, 1867.

IMPROVEMENT IN LAND-ROLLER.

*The Schedule referred to in these Letters Patent and making part of the same.*

TO ALL WHOM IT MAY CONCERN:

Be it known that I, WILLIAM W. BALLARD, of Davisburg, in the county of Oakland, and in the State of Michigan, have invented certain new and useful Improvements in Land-Rollers; and do hereby declare that the following is a full, clear, and exact description thereof, reference being had to the annexed drawings, and to the letters of reference marked thereon, making a part of this specification.

In the annexed drawings A represents an oblong or other suitable-shaped frame, having a tongue, B, and seat D. C C C C represent a series of small rollers, which are secured under the frame by means of the adjustable bars H. These bars H are connected under the forward part of the frame A between small ear-plates $a$, and extend from thence obliquely to the centre of the rollers C, where they are bulged inwards to connect to said rollers and connected with the axles. These bars then form a curve, and project upwards through small openings in the rear part of the frame. $x$ and $x'$ represent small projections or lugs on each of the bars H, one above the frame A, and the other below it, for allowing said frame to rest upon, and to prevent the bars from slipping out of their openings. Rollers connected to the frame by these bars will at all times adjust themselves to suit the irregularity of the earth.

What I claim, is—

Arranging of series of rollers C C to the frame A, by means of the bars H, constructed as set forth and for the purposes described.

In testimony that I claim the foregoing I have hereunto set my hand this first day of August, 1867.

WM. W. BALLARD.

Witnesses:
JAMES H. DAVIS,
JOHN T. BALLARD.